United States Patent
Blotky et al.

(10) Patent No.: US 6,788,283 B1
(45) Date of Patent: Sep. 7, 2004

(54) BOOK WITH ELECTRONIC DISPLAY

(75) Inventors: Randolph M. Blotky, Los Angeles, CA (US); Gregory B. Thagard, Los Angeles, CA (US); John H. Dargan, Palos Verdes Estates, CA (US)

(73) Assignee: Warner Bros. Entertainment Inc., Burbank, CA (US)

(*) Notice: Subject to any disclaimer, the term of this patent is extended or adjusted under 35 U.S.C. 154(b) by 0 days.

(21) Appl. No.: 09/426,238

(22) Filed: Oct. 25, 1999

(51) Int. Cl.$^7$ .................................................. G09G 5/08
(52) U.S. Cl. ........................ 345/156; 345/901; 434/317
(58) Field of Search ............................. 345/1, 121, 156, 345/169, 173, 206, 87, 901; 395/155, 500, 800; 434/335, 317, 178

(56) References Cited

U.S. PATENT DOCUMENTS

| | | | | |
|---|---|---|---|---|
| 4,355,984 A | * | 10/1982 | Slavik et al. ............... | 434/335 |
| 4,703,573 A | * | 11/1987 | Montgomery et al. ......... | 40/455 |
| 4,997,374 A | * | 3/1991 | Simone ....................... | 434/317 |
| 5,109,354 A | * | 4/1992 | Yamashita et al. .......... | 708/110 |
| 5,239,665 A | * | 8/1993 | Tsuchiya .................... | 395/800 |
| 5,417,575 A | * | 5/1995 | McTaggart .................. | 434/317 |
| 5,419,705 A | * | 5/1995 | Sandvik ...................... | 434/317 |
| 5,463,725 A | * | 10/1995 | Henckel et al. .............. | 395/155 |
| 5,467,102 A | * | 11/1995 | Kuno et al. ..................... | 345/1 |
| 5,485,176 A | * | 1/1996 | Ohara et al. ................ | 345/173 |
| 5,534,888 A | * | 7/1996 | Lebby et al. ............... | 345/121 |
| 5,739,814 A | * | 4/1998 | Ohara et al. ................ | 345/173 |
| 5,761,485 A | * | 6/1998 | Munyan ..................... | 395/500 |
| 5,909,207 A | * | 6/1999 | Ho ............................. | 345/156 |
| 6,041,215 A | * | 3/2000 | Maddrell et al. ............ | 434/317 |
| 6,098,325 A | * | 8/2000 | Goldman ..................... | 40/495 |
| 6,124,851 A | * | 9/2000 | Jacobson .................... | 345/206 |
| 6,164,534 A | * | 12/2000 | Rathus et al. ............... | 235/380 |
| 6,416,326 B1 | * | 7/2002 | Oh .............................. | 434/178 |
| 6,525,706 B1 | * | 2/2003 | Rehkemper et al. .......... | 345/87 |

* cited by examiner

Primary Examiner—Amr Awad
Assistant Examiner—Alecia D. Nelson
(74) Attorney, Agent, or Firm—Gottlieb, Rackman & Reisman, P.C.

(57) ABSTRACT

An electronic book includes pages with printed materials, a display showing selectively a plurality of images and a control circuit arranged to cause pictures to be displayed in accordance with pages being viewed by a reader. In one embodiment, a sensor is used to detect which page is the reader looking at. In other embodiments, an automatic sensor or a sensor operated by the reader is used to determine what images are to be shown. Multiple images are also displayed in sequence to form moving images. In addition, speakers may also be provided to reproduce sounds.

20 Claims, 6 Drawing Sheets

BOOK WITH ELECTRONIC DISPLAY

BACKGROUND OF THE INVENTION

A. Field of Invention

This invention pertains to a book, magazine or other printed media which incorporates an electronic display and a circuit arranged to provide various images on the display. More particularly, the present invention pertains to an electronic book with an integral display arranged to show still or moving images display-keyed to particular pages of the book.

B. Description of the Prior Art

Books, and especially children's books, as well as encyclopedias, dictionaries, technical manuals, and textbooks, are frequently provided with visual materials. These materials may provide additional information, generally enhance the experience of reading a book and make the book easier to understand. For example, children's books often include color pictures and illustrations associated with a particular story. Encyclopedias and textbooks include pictures, illustrations, maps, drawings, charts and other graphic representations of the materials and subject matter discussed therein. However, even with modern printing techniques, incorporating such visual material into a book is difficult and labor intensive. The process of incorporating graphic material in a book is further complicated if this visual material is in color. Moreover printing books with color materials is also expensive and often results in very poor images.

In many instances would be advantageous to Provide a book capable of showing moving images and/or other multimedia presentations. However, moving images cannot be provided using existing printing technologies.

In many instances, it may also be advantageous to incorporate into a book means of providing not only visual but also audio materials, (i.e., sounds). Some crude attempts have also been made to provide books with the capability of replaying sounds consisting of an LP record and a needle. The needle was placed on the record and the record was manually rotated. Since it was very hard to rotate the needle at a constant speed, the pitch of the sounds produced by this arrangement was uneven and hence it was difficult to understand. Moreover, the apparatus did not include an electrical amplifier but instead the sounds were produced by the mechanical vibrations of the needle. Thus the quality of the sound produced by this apparatus was completely unacceptable.

Attempts have been made to make all electronic books which are essentially hand-held devices consisting of a screen for displaying text and a memory in which alphanumeric characters corresponding to a book are stored and retrieved on request. These devices are very expensive at the present time, they require special memory devices, and are not very practical.

OBJECTIVES AND SUMMARY OF THE INVENTION

In view of the above disadvantages of the prior art, it is an objective of the present invention to provide a book or other similar printed media which is capable of displaying various images electronically.

A further objective to provide a book with a single display capable of showing images keyed to specific pages of the book.

A further objective is to provide a book capable of presenting a multi-image presentation composed of stills, moving images and/or sounds.

Other objectives and advantages of the invention shall become apparent from the following description of the invention.

Briefly, an electronic book constructed in accordance with this invention includes a plurality of pages bearing some printed matter and bound to form a book. An electronic display with a controller is attached to the book and it displays images. The images are selected based on signals received from a page sensor which can detect the page being viewed by the reader. Alternatively, a sensor is provided which detects particular indicia on a given page. In yet another alternative embodiment, a manual image selector is provided which is manipulated by the reader.

Multiple images can be displayed in sequence to show moving images. Speakers may also be provided for reproductive sounds.

DETAILED DESCRIPTION OF THE INVENTION

Figure 1:
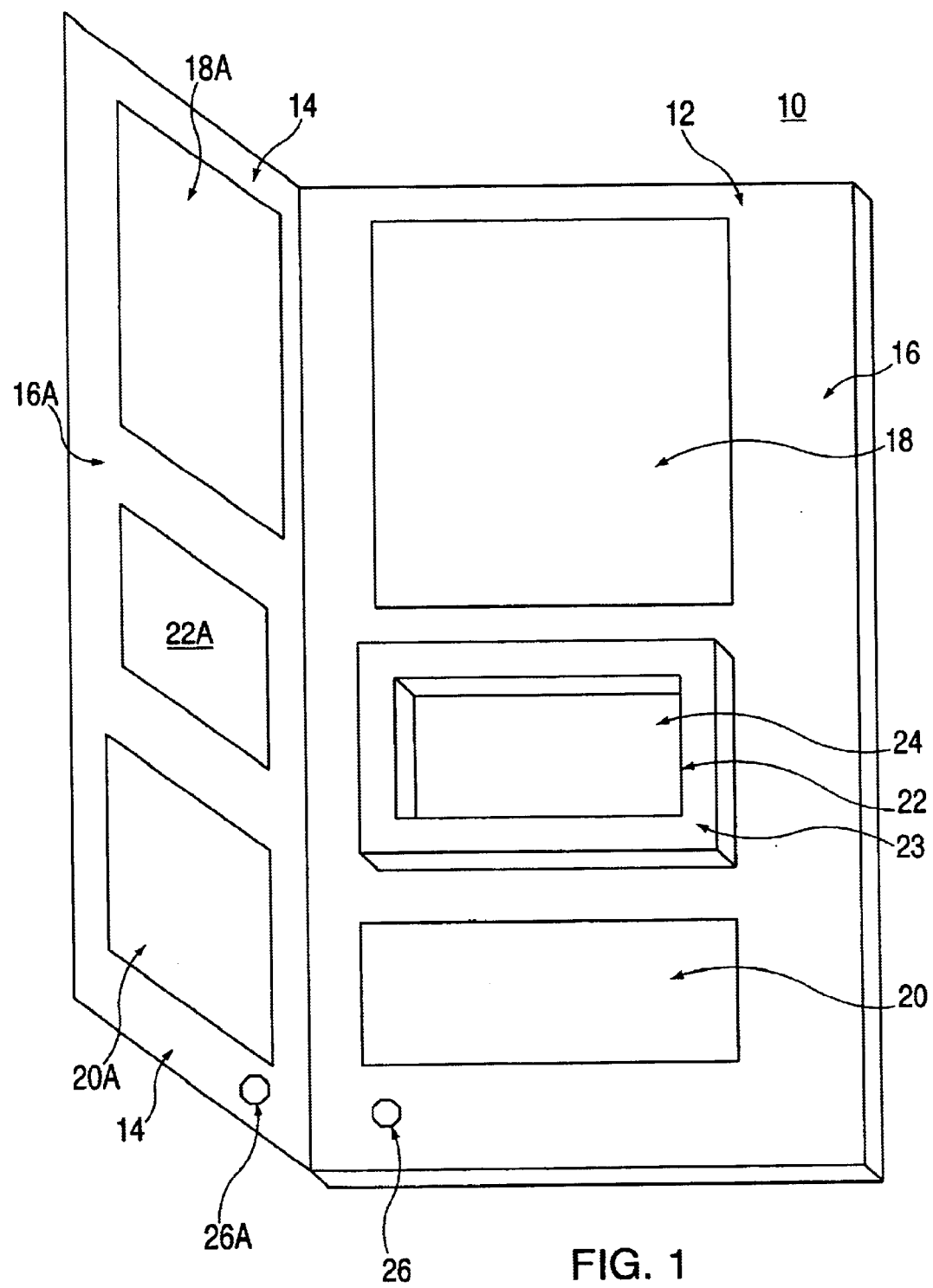
FIG. 1 shows a perspective view of an open book with an electronic display in accordance with this invention wherein the display is seen through windows made in the pages of the book.

Referring first to FIG. 1, an electronic book 10 is shown opened at two consecutive pages 12 and 14. Page 12 has a top surface 16 with two zones 18, 20 reserved for printed text. Between these two zones 18, 20 there is provided with a cut out or a window 22 through which a display 24 is seen. The display 24 may be recessed within the cavity formed by window 22 which is made in all of the pages disposed underneath page 12, and may be surrounded by a raised frame 23 which protrudes through the pages of the book 10.

Page 14 has a back surface 16A with zones 18A, 20A reserved for text and a window, 22A.

The pages of book 10 also have an element 26 for identifying each page electronically and uniquely. Details of the device are discussed below.

Figure 2:
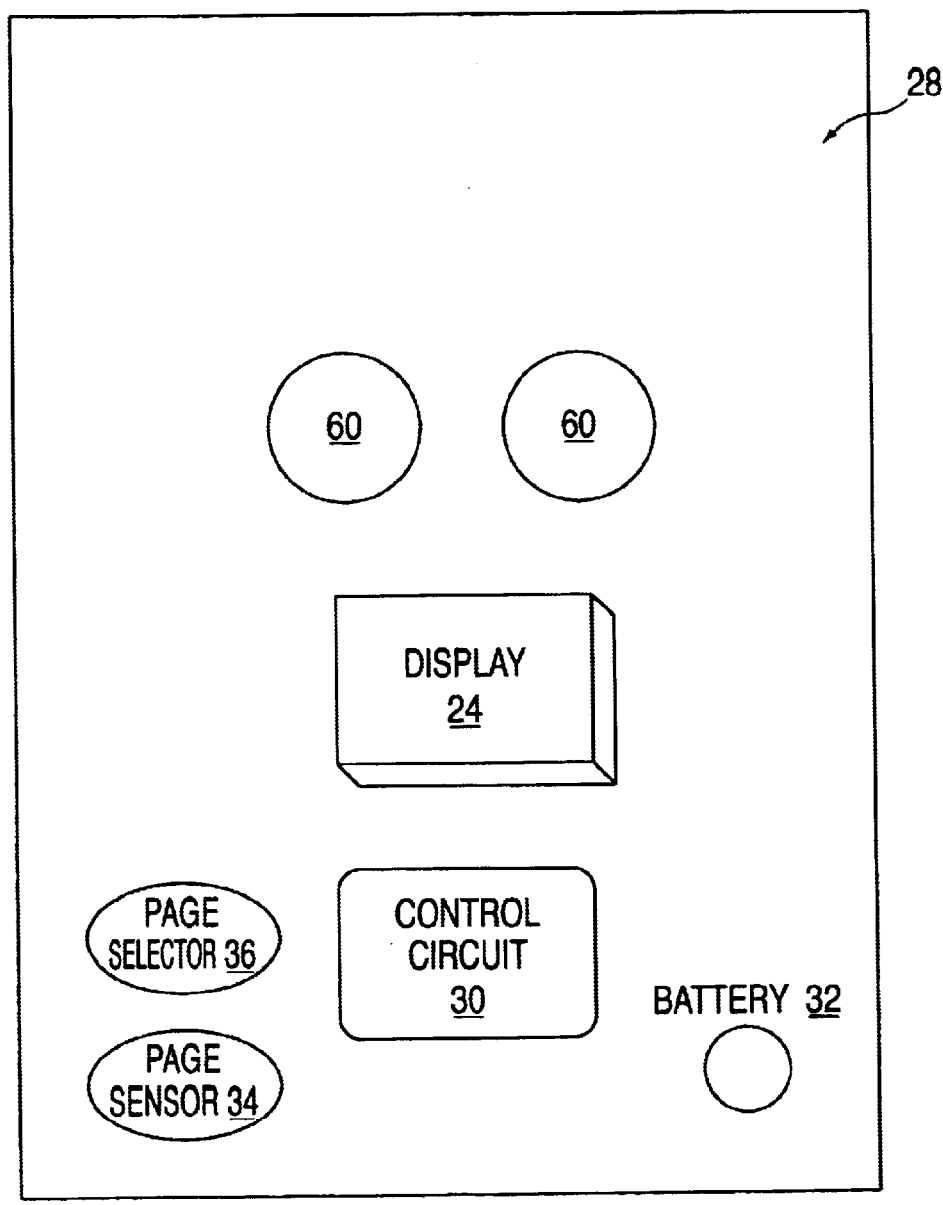
FIG. 2 shows a plan view of a last page of the book of FIG. 1.

Referring to FIG. 2, the last page 28 of the book is shown supporting the display 24 as well as a control circuit 30, a battery 32, and optionally, a page sensor 34 and/or a page selector 36.

The elements 24, 30, 32, 34 are shown as discrete elements for the sake of clarity. However, it should be understood that they could be packaged together, as well. Moreover, the elements 30, 32, 34 could be attached to, or could be imbedded into the last page 28 of the book.

Figure 3:
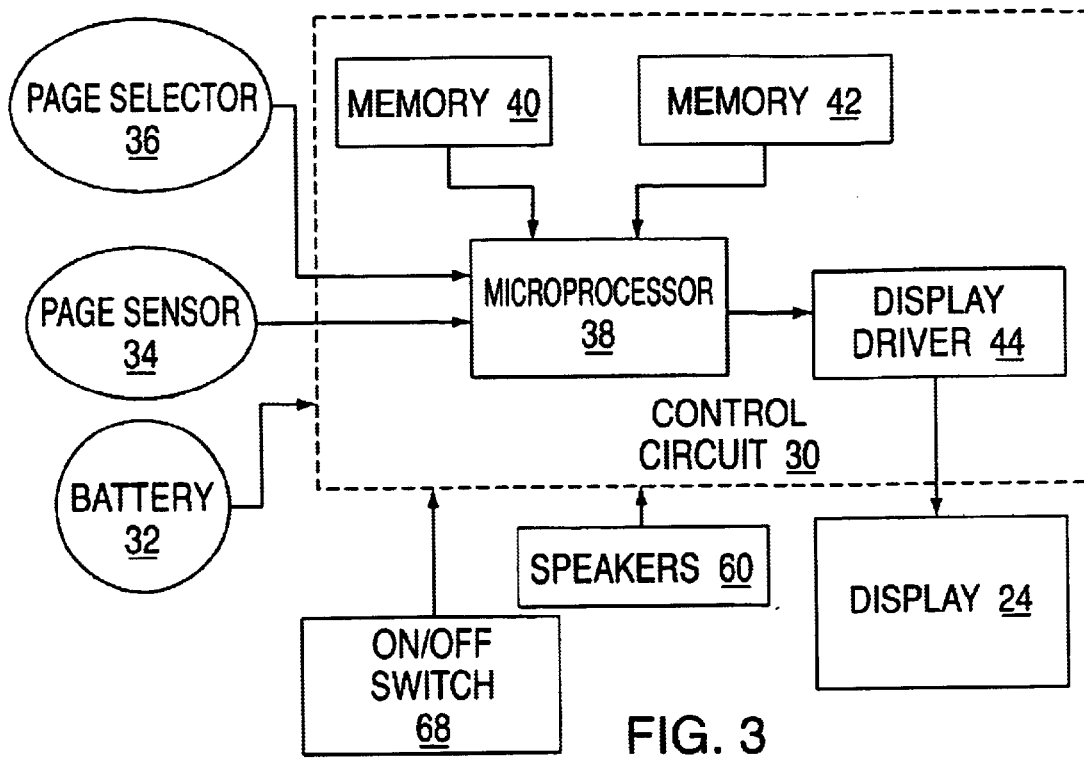
FIG. 3 shows a block diagram of the control circuitry for the display.

Referring now to FIG. 3, the control circuit 30 includes a microprocessor 38, a first memory 40, a second memory 42 and a display driver 44. Battery 32 provides power to the elements shown in FIGS. 2 and 3. A switch 68 is also provided to turn the control circuit 30 on or off.

Memory 40 can be a permanent memory used to store programs and operational parameters for the microprocessor 38. Memory 42 may be a replaceable memory such as a flash card and can be used to store imaging data for display 24. The microprocessor 38 retrieves data from memory 42 in accordance with certain criteria and sends the same to display driver 44. The display driver controls the images shown by display 24.

In one embodiment of the invention, the page sensor 34 is used to determine the current page that is being viewed by a reader.

Figure 4:
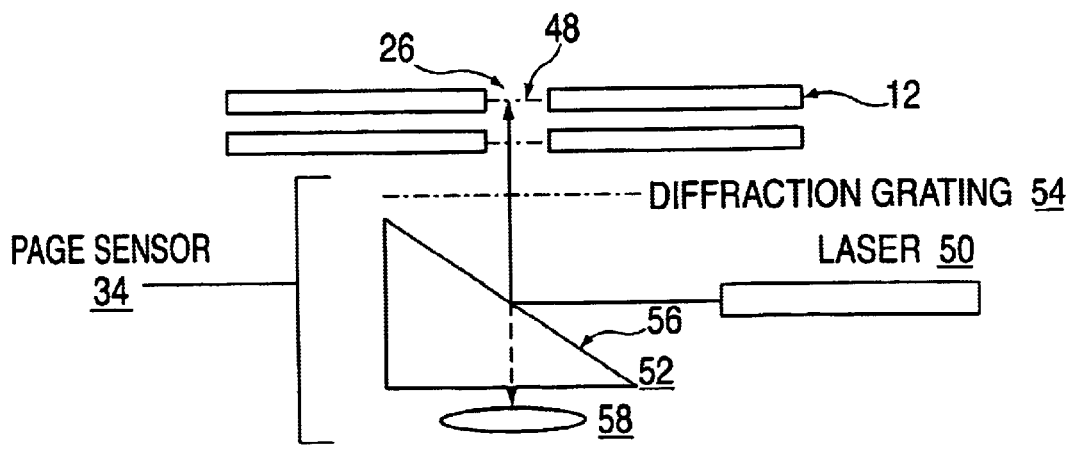
FIG. 4 shows details of the page sensor of FIG. 3.

The page sensor 34 can be implemented in a number of different ways. For example, as discussed above and shown in FIGS. 1 and 4, each page can be provided with a page identifying element 26 which may be an auxiliary window. In one embodiment, the auxiliary window 26 of each page 12 is provided with a unique hologram formed on membrane 48 identifying the page. As seen in FIG. 4, the page sensor 34 includes further a laser 50 which is arranged to direct a beam of light toward a prism 52. Prism 52 is arranged to direct the beam from the laser 50 upward through a diffraction grating 54 through the window 26 and at membrane 48. The prism 52 has a partially transmissive surface 56 which allows some light to pass through. Disposed underneath prism 52 there is a detector 58 which detects the images on the holograms illuminated by the beam and sends them to control circuit 30. The microprocessor 38 analyzes the images from the detector 58 and compares them with images 150 in a look-up table to determine the current page number. The look-up table may be part of memory 40.

Memory 40 can be a permanent memory used to store programs and operational parameters for the microprocessor 38. Memory 42 may be a replaceable memory such as a flash card and can be used to store imaging data for display 24. The microprocessor 38 retrieves data from memory 42 in accordance with certain criteria and sends the same to display driver 44. The display driver controls the images shown by display 24.

In one embodiment of the invention, the page sensor 34 is used to determine the current page that is being viewed by a reader.

The page sensor 34 can be implemented in a number of different ways. For example, as discussed above and shown in FIGS. 1 and 4, each page can be provided with a page identifying element 26 which may be an auxiliary window. In one embodiment, the auxiliary window 26 of each page 12 is provided with a unique hologram formed on membrane 48 identifying the page. As seen in FIG. 4, the page sensor 34 includes further a laser 50 which is arranged to direct a beam of light toward a prism 52. Prism 52 is arranged to direct the beam from the laser 50 upward through a diffraction grating 54 through the window 26 and at membrane 48. The prism 52 has a partially transmissive surface 56 which allows some light to pass through. Disposed underneath prism 52 there is a detector 58 which detects the images on the holograms illuminated by the beam and sends them to control circuit 30. The microprocessor 38 analyzes the images from the detector 58 and compares them with images in a look-up table to determine the current page number. The look-up table may be part of memory 40.

Figure 5:
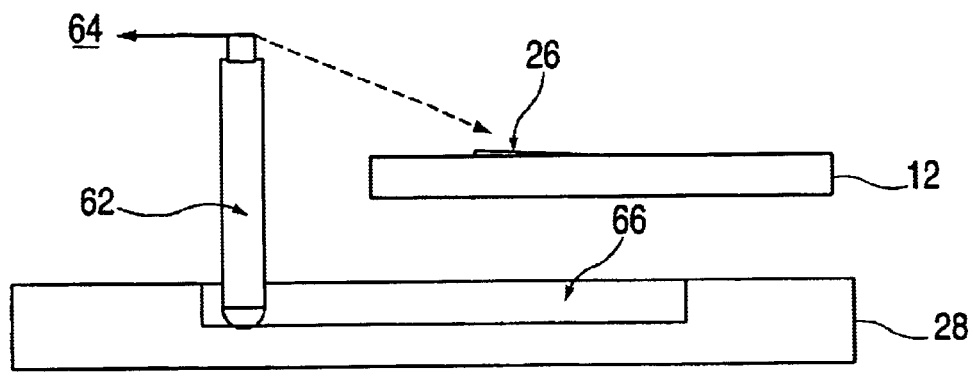
FIG. 5 shows an alternate embodiment of the invention

Referring now to FIG. 5 in an alternate embodiment of the invention instead of an auxiliary window, the page identifying element may be a printed page indicia 26A such as a bar code. The book 10 is also provided with a bar code reader 64 disposed advantageously on a fold-away arm 62. When not in use, arm 62 can be folded in a pocket 66 at the bottom of the book 10. The bar code reader 64 reads the bar code to detect the current page.

Switch 68 may be a pressure sensing switch which is responsive to a change of pressure when the book is opened, a light sensor monitoring ambient light through the window 26, a proximity switch operated when the arm 62 is removed from its pocket, or even a simple on/off switch operated by the user. The switch 68 may be disposed on page 28 or at other locations of the book 10.

Figure 6:
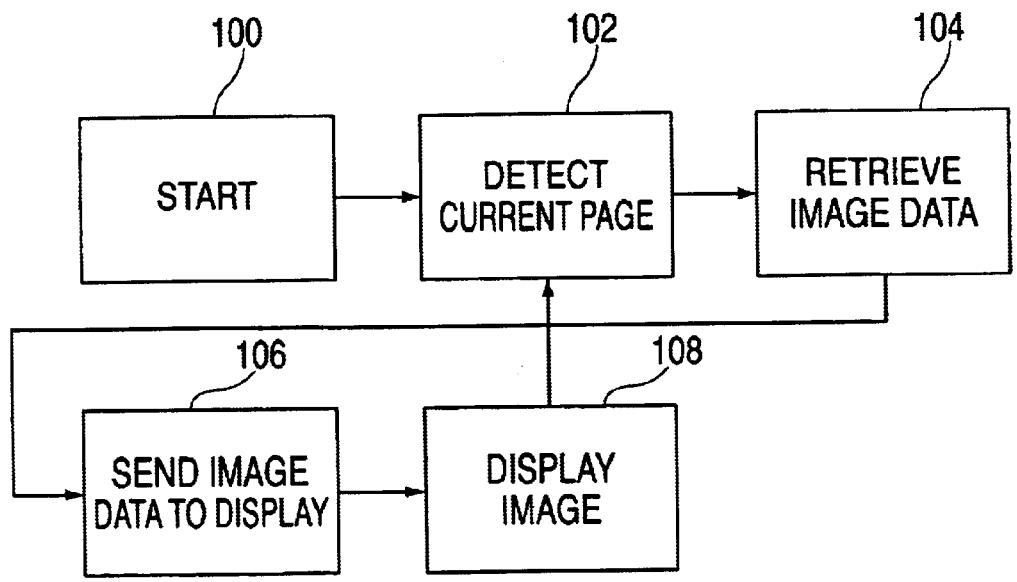
FIG. 6 shows a flow chart for the operation of the book of FIG. 1.

The electronic book 10 operates as shown in the flow chart of FIG. 6. In step 100, the system is initiated, for example, when switch 68 is activated. It is assumed that prior to this activation, a memory 42 with the appropriate images has been loaded or otherwise inserted.

In step 102 a current page number is obtained or determined either by using the sensor of FIG. 4 or the sensor of FIG. 5.

In step 104, the current page number is used to retrieve digital data from memory 42 corresponding to the image associated with the current page.

In step 106 this digital data is provided to the driver 44 the driver 44 then generates corresponding control commands for the display 24 to show the respective image.

The circuit then cycles back to step 102 and waits for a new page to be identified.

In the description provided above images are associated with, text is provided only on one side of each page. For two sided pages the sensor of FIG. 5 may be arranged to sense the page indicator element on either page. Moreover, while it may be preferable to provide a page sensor as discussed above, in some instances, it may be preferable to provide manual keys to indicate the current page to the microprocessor. For example, providing an electronic book with manual page entry keys will be most likely cheaper to implement. In addition or instead of the page indication keys, other navigational keys may be provided which may be used to navigate between different images. These keys may be useful if more than a single image is provided for each page, or if a user would like to see the images associated with different pages then the ones he is presently viewing. For this purpose a separate page selector 36 may be provided. This page selector 36 may be a sample on/off or pressure switch which is activated each time a reader turns a page. Alternatively the selector 36 may be a keyboard on which the actual page of interest is entered. Another alternative would be to provide directional keys (not shown) as selector elements. One such key, for example a key with a right arrow could be used to step to the next page while a key with a left arrow could be used to step to a previous page.

In the embodiments discussed so far, a single image is shown on display 24. However, if the memory 42 has sufficient capacity, instead of a single image, a plurality of images may be shown instead in a quick succession (in the order of 12–18 per second) thereby generating in effect moving images. Moreover, sounds (for which data is stored in memory 40 as well) may also be played simultaneously with the image(s) there. Sounds may be played through the speakers 60, which may also be disposed on the back page 28, as shown.

Figure 7:
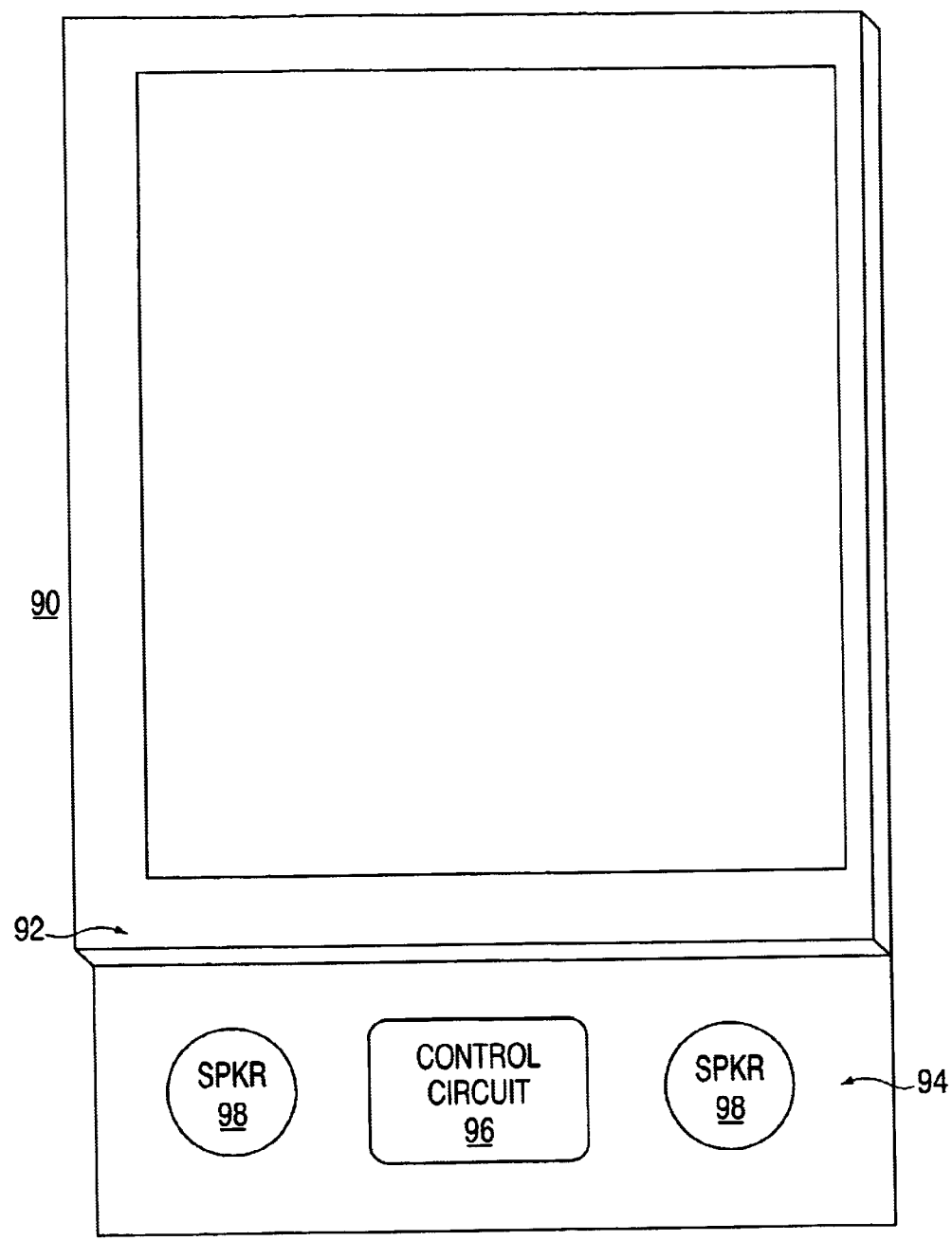
FIG. 7 shows another alternative embodiment wherein the display is offset literally from the pages of the book.

In the embodiments of FIGS. 1 and 2, the display 24 is visible through window formed in the pages. Of course, the display 24 may be mounted anywhere on the book 10 or even off the book although it is preferable that it be positioned such that it is visible to the reader while he is leafing through the book. For example, in FIG. 7 an embodiment of a book 90 is shown with pages 92 being shorter than a back page 94. The control circuit 96, speakers 98 and the other elements similar to the ones shown in FIG. 3 can then be placed on the section of back page 94 which is not overlapped by pages 92, as shown.

Figure 8:
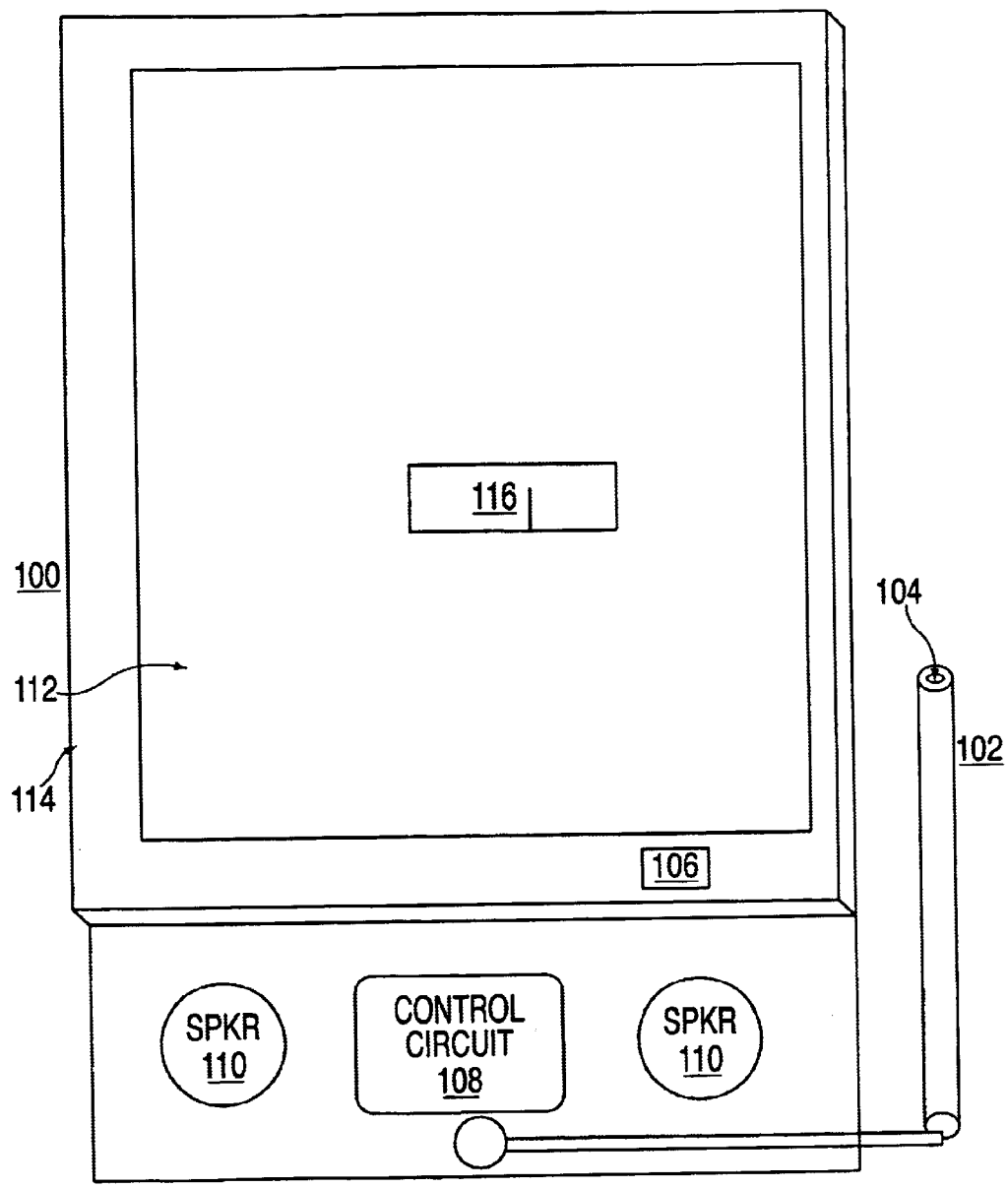
FIG. 8 shows another embodiment with a wand used to determine what images are to be shown.

In another alternate embodiment of the invention shown in FIG. 8, book 100 may be provided with a wand 102. The wand 102 is terminated with a reader head 104 capable of reading and decoding indicia 106 on each page 114. For example the indicia 106 may be a bar code or similar optical code. Alternatively, indicia 106 may be standard page numbers in which case the reader head or the microprocessor may include optical character recognitions(OCR) software. Since in this case only page numbers need to be recognized, the OCR software may be relatively simple. Alternatively, the text 112 on page 114 may have imbedded therein special characters 116 which can be scanned using the wand 102. For example, the characters may have a special color. These characters identify an image (normally associated with the text). Scanning the characters and then converting them yields a code that is used to identify a particular image and retrieve it for display.

Many other modifications may be made to the present invention without departing from the scope of the invention as set forth in the appended claims.

We claim:

1. A book comprising:
a first and a second book cover;
a plurality of pages bound together between said covers to form a book, at least some of the pages including printed material, said pages having cutouts;
an electronic display mounted on one of said covers and arranged and constructed to display images, said electronic display being positioned to make it visible through said cutouts;
a memory storing data corresponding to a plurality of images; and
a control circuit adapted to retrieve selectively data for one image from said memory and send said data to said electronic display to cause said electronic display to show said one image.

2. The book of claim 1 further comprising a page sensor arranged to identify a particular page at which said book is opened, wherein said control circuit is coupled to said page sensor and is adapted to select the image to be shown on said display specific to said particular page.

3. The book of claim 1 further comprising indicia identifying said image and a sensor arranged to sense said indicia;
wherein said control circuit is coupled to said sensor and is responsive to said indicia to retrieve the data corresponding to said image.

4. The book of claim 1 further comprising a back page, wherein said display is associated with said back page.

5. A book comprising:
a plurality of pages bound together and having cutouts;
an electronic display mounted within said book and associated with said pages and adapted to display images in response to a control signal, said electronic display being positioned to make it visible through said cutouts;
an image selector adapted to generate image identifying signals;
a controller adapted to receive said image identifying signals and to generate in response said control signal; and
a memory storing data corresponding to said images.

6. The book of claim 5 therein said image selector comprises a page sensor adapted to detect one of said pages.

7. The book of claim 5 wherein said image selector comprises a switch activated by a reader.

8. The book of claim 5 wherein said image selector includes an optical sensor adapted to detect text on said pages, said text identifying a particular image, and wherever said optical source and controller cooperate to cause said particular image to be shown on said display.

9. The book of claim 5 wherein said controller and display cooperate to show a plurality of images in sequence to generate moving images.

10. The book of claim 5 further comprising a speaker, where said controller is adapted to generate audio signals reproduced by said speaker.

11. A printed book comprising:
a plurality of printed pages, said pages including image identifying indicia;
a first and a second cover, with said printed pages being affixed in a predetermined order between said first and said second cover, said pages being formed with cutouts;
a control circuit attached to one said covers and adapted to sense said image identifying indicia;
an electronic display attached to said book within said covers and coupled to said control circuit, said electronic display being arrange and constructed to display graphic images associated with said image identifying indicia, said electronic display being positioned to make it visible through said cutouts; and
a memory storing data for a plurality of images, wherein said control circuit is adapted to retrieve data corresponding to one image as identified by said image identifying indicia.

12. The printed book of claim 11 wherein each page includes a transparent window and a transparent member covering said window, said indicia being disposed on said member.

13. The printed book of claim 12 wherein said controller is arranged to monitor said windows to detect the indicia on said members.

14. The printed book of claim 11 wherein said indicia comprise bar codes and said controller includes a bar code reader.

15. The printed book of claim 11 wherein said printed pages include, further comprising a sensor that includes an optical element constructed and arranged to detect said text.

16. A printed book comprising:
a plurality of printed pages, said pages including image identifying indicia;
a first and a second cover, with said printed pages being affixed in a predetermined order between said first and said second cover, said pages being formed with cutouts;
a control circuit attached to one said covers and adapted to sense said image identifying indicia;
an electronic display attached to said book within said covers and coupled to said control circuit, said electronic display being arrange and constructed to display graphic images associated with said image identifying indicia, said electronic display being positioned to make it visible through said cutouts; and
wherein each page includes a transparent window and a transparent member covering said window, said indicia being disposed on said member.

17. A printed book comprising:

a plurality of printed pages, said pages including image identifying indicia;

a first and a second cover, with said printed pages being affixed in a predetermined order between said first and said second cover, said pages being formed with cutouts;

a control circuit attached to one said covers and adapted to sense said image identifying indicia;

an electronic display attached to said book within said covers and coupled to said control circuit, said electronic display being arrange and constructed to display graphic images associated with said image identifying indicia, said electronic display being positioned to make it visible through said cutouts; and wherein said indicia comprise bar codes and said sensor includes a bar code reader.

18. A printed book comprising:

a plurality of printed pages, said pages including text;

a first and a second cover, with said printed pages being affixed in a predetermined order between said first and said second cover, said pages being formed with cutouts;

a control circuit attached to one said covers and including a sensor adapted to detect said text; and an electronic display attached to said book within said covers and coupled to said control circuit, said electronic display being arrange and constructed to display graphic images associated with said text, said electronic display being positioned to make it visible through said cutouts.

19. A book comprising:

a plurality of pages bound together and having cutouts;

an electronic display mounted within said book and associated with said pages and adapted to display images in response to a control signal, said electronic display being positioned to make it visible through said cutouts;

an image selector adapted to generate image identifying signals; and a controller adapted to receive said image identifying signals and to generate in response said control signal;

wherein said image selector includes an optical sensor adapted to detect text on said pages, said text identifying a particular image, and wherever said optical source and controller cooperate to cause said particular image to be shown on said display.

20. A printed book comprising:

a plurality of printed pages, said pages including text;

a first and a second cover, with said printed pages being affixed in a predetermined order between said first and said second cover, said pages being formed with cutouts;

a control circuit attached to one said covers and including a sensor adapted to detect said text; and an electronic display attached to said book within said covers and coupled to said control circuit, said electronic display being arrange and constructed to display graphic images associated with said text, said electronic display being positioned to make it visible through said cutouts;

wherein said controller and display cooperate to show a plurality of images in sequence to generate moving images.

* * * * *